United States Patent [19]

Nose et al.

[11] Patent Number: 4,590,772
[45] Date of Patent: May 27, 1986

[54] AIR CONDITIONING SYSTEM FOR VEHICLE

[75] Inventors: Toshimitsu Nose; Toshio Ōhashi, both of Atsugi, Japan

[73] Assignee: Nissan Motor Co., Ltd., Yokohama, Japan

[21] Appl. No.: 657,955

[22] Filed: Oct. 5, 1984

[30] Foreign Application Priority Data

Oct. 7, 1983 [JP] Japan .................. 58-187798

[51] Int. Cl.⁴ .................. F25B 39/04; F01P 7/02
[52] U.S. Cl. .................. 62/184; 62/DIG. 17; 236/35; 123/41.12
[58] Field of Search .................. 62/181, 183, 184, 507, 62/508, DIG. 17, 323.4, 323.1; 123/41.12, 41.11, 41.49; 236/35

[56] References Cited

U.S. PATENT DOCUMENTS

| | | | |
|---|---|---|---|
| 3,357,199 | 12/1967 | Harnish | 62/183 X |
| 3,390,538 | 7/1968 | Miller | 62/184 X |
| 3,390,539 | 7/1968 | Miner | 62/DIG. 17 |
| 4,133,185 | 1/1979 | Dickey | 62/323.1 |

FOREIGN PATENT DOCUMENTS

| | | | |
|---|---|---|---|
| 2629662 | 1/1977 | Fed. Rep. of Germany | 236/35 |
| 2806708 | 8/1978 | Fed. Rep. of Germany | 123/41.12 |

Primary Examiner—Harry Tanner
Attorney, Agent, or Firm—Schwartz, Jeffery, Schwaab, Mack, Blumenthal & Evans

[57] ABSTRACT

An air-conditioning system for a vehicle is configured so as to adjust draft volume to a condensor for an air conditioner on the basis of the pressure of refrigerant circulated through a condensor and atmospheric temperature to optimize draft volume to be distributed to the condensor and the radiator. The air-conditioning system comprises a plurality of motor-fans for the condensor and the radiator, a refrigerant pressure sensor provided at the input and output of the condensor, an atmospheric temperature sensor, and an operational mode control unit responsive to the refrigerant pressure sensor and to the atmospheric temperature sensor.

7 Claims, 4 Drawing Figures

AIR CONDITIONING SYSTEM FOR VEHICLE

BACKGROUND OF THE INVENTION

The present invention relates to an air-conditioning system for a vehicle which drivingly control a group of motor-fans for air cooling a radiator and a condensor for an air conditioner in an optimum manner.

An example of conventional air conditioning systems for a vehicle is shown in Japanese Utility Model Published Publication No. Sho 57-42095.

However, such a conventional air conditioning system for a vehicle can solely switch draft volume directed to a radiator and a condensor in two steps, by turning motor-fans ON or OFF. Namely, this air conditioning system is not only incapable of fine adjustment in draft volume in accordance with running conditions of the engine varying in a complicated fashion, but also is incapable of fine adjustment in accordance with operating conditions of an air conditioner and changes in atmospheric temperature. Accordingly, this results in inappropriate cooling and wasteful consumption of power.

SUMMARY OF THE INVENTION

With the above in mind, an object of the present invention is to provide an air conditioning system for a vehicle capable of more adequately adjusting draft volume in accordance with the complex changes in operating conditions of an air conditioner.

Another object of the invention is to provide an air conditioning system for a vehicle further capable of properly adjusting draft volume in accordance with changes in atmospheric temperature.

A further object of the present invention is to provide an air conditioning system for a vehicle configured in a manner that when an air conditioner is used, a group of fan-motors is drivingly controlled primarily to cool a condensor for the air conditioner, while when the air conditioner not used, the group is drivingly controlled primarily to cool the radiator for the engine.

According to the present invention, there is provided an air conditioning system for a vehicle configured so as to vary draft volume to the radiator through which engine cooling water is circulated and a condensor provided in a refrigeration circuit for an air conditioner.

BRIEF DESCRIPTION OF THE DRAWINGS

The features and advantages of an air-conditioning system for a vehicle according to the present invention will become more apparent from the following description taken in conjunction with the accompanying drawings, in which.

DETAILED DESCRIPTION OF THE PREFERRED EMBODIMENT

To facilitate the understanding of the present invention, a brief reference will be made to a conventional automotive air-conditioning system.

Figure 1:
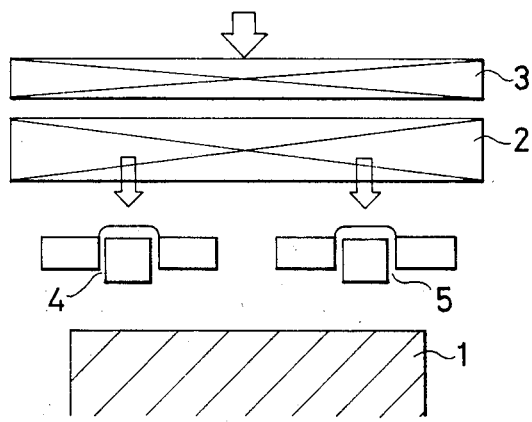
FIG. 1 is an explanatory view schematically illustrating a conventional air-conditioning system for a vehicle.

Referring to FIG. 1, the conventional system comprises a radiator 2 for air cooling a cooling water for an engine (water cooled engine) 1, and a condensor 3 for cooling a vehicle cabin or a passenger's compartment provided in parallel with the radiator 2 at the front surface thereof. The conventional system further comprises two motor-fans 4 and 5 for air cooling the radiator 2 and the condensor 3 between the engine 1 and the radiator 2.

In this system there are only two driving modes, one in which the motor-fans 4 and 5 are driven and another in which the motor fans 4 and 5 are not driven.

Prior to proceeding with the discussion of the embodiment, the elementary configuration of an air-conditioning system for a vehicle according to the present invention will be described with reference to FIGS. 2 and 3. The first elementary arrangement will be referred to with reference to the block diagram of FIG. 2. A refrigerant or cooling medium pressure sensor means 101 is provided for sensing pressure of the refrigerant flowing into a condensor 100 and flowing therefrom. An operational mode control means 102 is configured to select one of four operational modes on the basis of the refrigerant pressure sensed by the refrigerant pressure sensor means 101. The first operational mode is called "parallel drive mode" in which the power source is connected to the plurality of motor-fans (103 and 104 in this example) in parallel. The second mode is called "serial drive mode" in which the power source is connected to the plurality of motor-fans in serial. The third mode is called a "partial drive mode" in which the power source is connected to less than all of the plurality of motor-fans. The fourth mode is called an "OFF mode" in which all of the plurality of motor-fans are turned off. The operational mode control means 102 is configured so as to further respond to a cooling water temperature flowing into a radiator 105 and flowing therefrom.

Now, the second arrangement will be described with reference to the block diagram of FIG. 3. In this figure, the components idential to those in FIG. 2 are designated by the same or like reference numerals, respectively, and explanation of same will be omitted.

Figure 2:
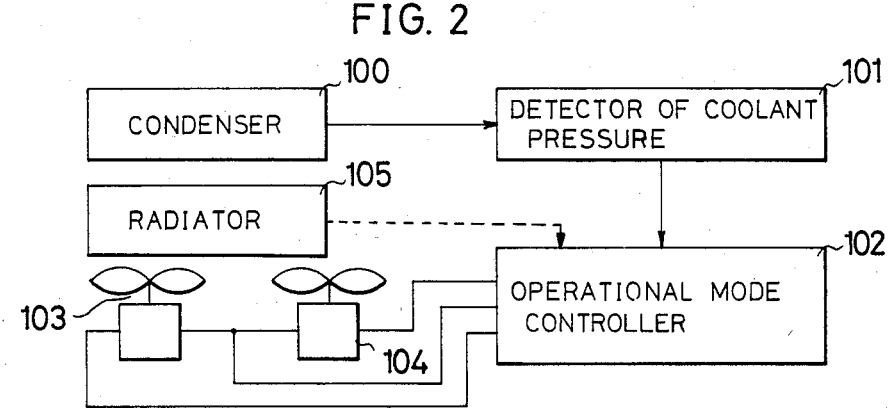
FIGS. 2 and 3 are block diagrams each schematically illustrating an elementary configuration of an air-conditioning system for a vehicle according to the present invention.
Figure 3:
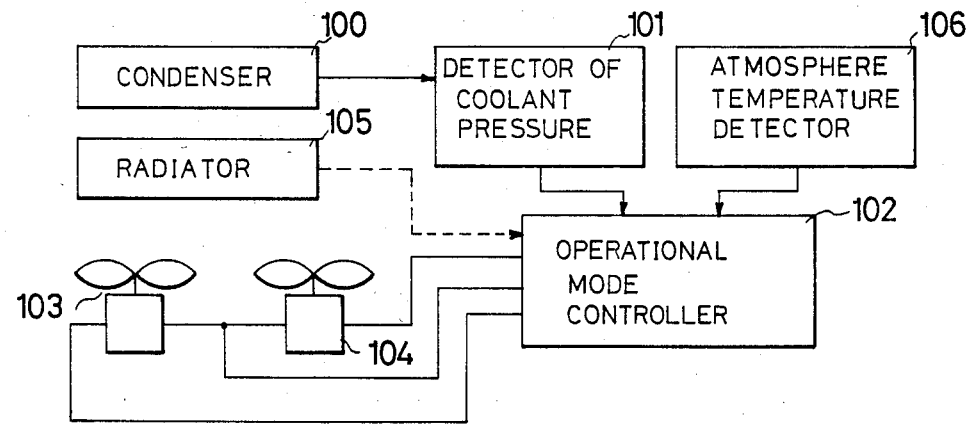

An atmospheric temperature sensor means 106 is further provided for sensing atmospheric temperature in addition to the components shown in FIG. 2.

An operational mode control means 102 is constituted so as to select one of the above-mentioned four operational modes on the basis of the refrigerant pressure sensed by the refrigerant pressure sensor means 101 and atmospheric temperature sensed by the atmospheric temperature sensor means 106. Namely, the operational mode control means (102) is operative based on the correlative operation in regard to two parameters indicative of refrigerant pressure and atmospheric temperature, thereby it enabling to perform a desired operational mode control so as to more faithfully accommodate the actual air-conditioning environment as compared with that shown in FIG. 2.

Figure 4:
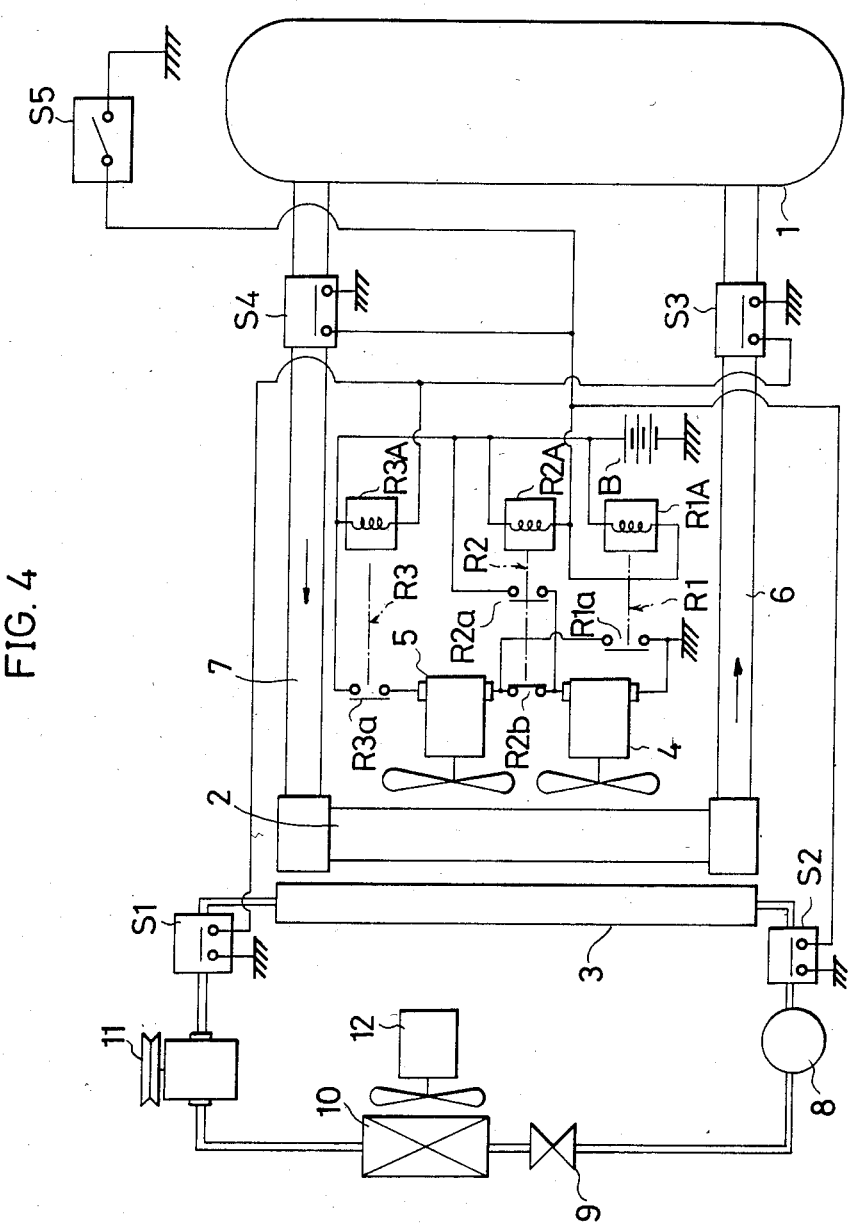
FIG. 4 is an explanatory view illustrating an embodiment of an air-conditioning system for a vehicle according to the present invention.

The preferred embodiment of an air conditioning system for a vehicle according to the present inventional will be described with reference to FIG. 4.

In this embodiment, similar to the conventional system shown in FIG. 1, there are provided a radiator 2 and a condensor adjacent to the radiator 1 in front of an engine 1.

The condensor 3 is provided for constituting a refrigeration circuit comprising a liquid tank 8, an expansion valve 9, an evaporator 10 and a compressor 11 etc., which functions as cooling means for a refrigerant whose temperature and pressure will be both raised under application of compressive action rendered by the compressor 11. Air cooled by the refrigeration circuit is admitted within a vehicle cabin by means of a blower motor 12.

On the input side of the condensor 3, there is provided a pressure switch S1 for sensing the pressure of the refrigerant (a pressure at the input of the condensor). For instance, when the pressure is above 15 bar, the pressure switch S1 turns on, while when less than 15 bar, it turns off. On the other hand, on the output side of the condensor 3, there is provided a pressure switch S2 for sensing the pressure of the refrigerant (a pressure at the output of the condensor). For instance, when the pressure is more than 16 bar, the pressure switch S2 turns on, while when less than 16 bar, it turns off.

The pressure switch S1 is connected to a power source B through an electromagnetic relay R3 to be described later and to a water temperature switch (thermoswitch) S3. The pressure switch S2 is connected to electromagnetic relays R1 and R2 to be referred to later and to an atmospheric temperature switch S5.

Between the engine 1 and the radiator 2, there are provided motor drive fans 4 and 5. The radiator 2 and the condensor 3 are cooled by air drafts from these motor drive fans 4 and 5.

The engine 1 and the radiator 2 are interconnected by means of radiator hoses 6 and 7. A thermoswitch S3 which effects ON-OFF operation depending on a temperature of engine cooling water flowing from the radiator 2 into the engine 1 is provided at the radiator hose 6 so that its sensing area is exposed to the engine cooling water. For instance, when the temperature of the engine cooling water is above 90° C., the thermoswitch S3 turns on, while when less than 90° C., it turns off.

Likewise, a thermoswitch S4 which effects ON-OFF operation depending on a temperature of engine cooling water flowing from the engine 1 into the radiator 2 is provided at the radiator hose 7 so that its sensing area is exposed to the engine cooling water. For instance, when the temperature of the engine cooling water is above 97° C., the thermoswitch S4 turns on, while when less than 97° C., it turns off. These thermoswitches S3 and S4 may comprise a thermostatic switch or a thermistor.

The water temperature switch S3 has one end grounded, and the other end connected to the relay R3 and to one end of refrigerant pressure sensor switch S1 in parallel with the relay R3. On the other hand, the water temperature switch S4 has one end grounded and the other end connected to the relays R1 and R2.

Further, at a desired portion inside the vehicle body, there is provided an atmospheric switch S5 for sensing atmospheric temperature outside the vehicle body. In accordance with an atmospheric temperature, the atmospheric switch S5 determines the range in which the maximum cooling capacity is required to the refrigeration circuit. For instance, the setting of the atmospheric switch S5 is such that when the atmospheric temerature is more than 28° C., it turns on, while when less than 28° C., it turns off.

Between the motor drive fans 4 and 5 and the power source B, there are provided a relay circuit comprising the three electromagnetic relays R1, R2 and R3. The relay R1 is provided with a winding R1A and a normally open contact R1a which is closed when the winding R1A is energized. The relay R3 is provided with a winding R3A and a normally open contact R3a which is closed when the winding R3A is energized. Further, the relay R2 is provided with a winding R2A and a normally open contact R2a and a normally closed contact R2b which are closed an opened, respectively, when the winding R2A is energized.

The relay circuit comprising relays R1 to R3 is operative in response to signals from the switches S1 to S5. Namely, the relay circuit functions as an operational mode control means for selecting one of four operational modes comprising a high drive mode for parallely providing a power to the motor drive fans 4 and 5, a medium drive mode for providing a power to one of the motor drive fans 4 and 5, a low drive mode for serially providing a power to the motor drive fans 4 and 5, and an OFF mode for turning off power supply thereto.

The operation of the air conditioning system will be described with reference to the Table. In the columns each showing the operation of a motor drive fan, "OFF" denotes an off mode, "LO" low drive mode (serial drive mode), "MI" medium drive mode (partial or single drive mode), and "HL" a high drive mode (parallel drive mode), respectively. The transitional point of each temperature or pressure condition has been included in both ranges. It will be understood from this that whether the transitional point is included in either the upper or lower range is arbitrary.

TABLE

| Condition | | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| Pressure of coolant into condensor | 15 bar or less | o | o | o | o | o | o | o | o | | | | | | | | | |
| | 15 bar or more | | | | | | | | | o | o | o | o | o | o | o | o | o |
| Pressure of coolant from condensor | 16 bar or less | o | o | o | o | o | o | o | o | o | o | o | o | | | | | o |
| | 16 bar or more | | | | | | | | | | | | | o | o | o | o | |
| Temperature of water from radiator | 90° C. or lower | o | | o | | o | | o | | o | | o | | o | | o | | o |
| | 90° C. or higher | | o | | o | | o | | o | | o | | o | | o | | o | |
| Temperature of water into radiator | 97° C. or lower | o | o | | | o | o | | | o | o | | | o | o | | | o |
| | 97° C. or higher | | | o | o | | | o | o | | | o | o | | | o | o | |
| Atmosphere | 28° C. or | o | o | o | o | | | | | o | o | o | o | o | o | o | o | o |

TABLE-continued

| | | | | | | | | | | | | | | | | | |
|---|---|---|---|---|---|---|---|---|---|---|---|---|---|---|---|---|---|
| temperature | lower | | | | | | | | | | | | | | | | |
| | 28° C. or higher | | | | o | o | o | o | | | | | | | | | o |
| Driving mode of motor-fan | | OFF | LO | MI | HI | MI | HI | MI | HI | LO | LO | HI | HI | HI | HI | HI | HI | HI |

| | | Condition | 18 | 19 | 20 | 21 | 22 | 23 | 24 |
|---|---|---|---|---|---|---|---|---|---|
| Pressure of coolant into condensor | 15 bar or less | | | | | | | | |
| | 15 bar or more | | o | o | o | o | o | o | o |
| Pressure of coolant from condensor | 16 bar or less | | o | o | o | | | | |
| | 16 bar or more | | | | | o | o | o | o |
| Temperature of water from radiator | 90° C. or lower | | | o | | o | | o | |
| | 90° C. or higher | | o | | o | | o | | o |
| Temperature of water into radiator | 97° C. or lower | | o | | | o | o | | |
| | 97° C. or higher | | | o | o | | | o | o |
| Atmosphere temperature | 28° C. or lower | | | | | | | | |
| | 28° C. or higher | | o | o | o | o | o | o | o |
| Driving mode of motor-fan | | | HI | HI | HI | HI | HI | HI | HI |

In the Table, operating conditions designated by 1 to 8 show that the air conditioner is not used (i.e. the pressure at the input of the condensor is less than 15 bar), while those designated by 9 to 24 show that the air conditioner is used (i.e. the particular pressure is more than 15 bar).

First, assuming that the air conditioner is not used, the operation when the atmospheric temperature is less than 28° C. will be described.

Since the temperatures flowing from the radiator and flowing thereinto are less than setting temeratures of 90° C. and 97° C., respectively, immediately after the engine starts, the water temperature switches S3 and S4 both turn off. As a result, the relays R1 to R3 are inoperative, so that the two motor drive fans 4 and 5 do not become operative. Namely, the operational mode is "off mode" (condition 1).

Then, when the temperature of water flowing from the radiator is more than 90° C. as a result of the heating of the engine, the water temperature switch S3 turns on. As a result, the relay 3 becomes operative to serially connect two motor-fans 4 and 5 to the power source B. Thus, these motor-fans 4 and 5 rotate at a low speed. Namely, the operational mode is a "low drive mode" (condition 2).

Further, e.g. when the engine is in idling condition, i.e. when the temperature of water flowing flow from the radiator is less than 90° C., but the temperature of water flowing thereinto is more than 97° C., the water temperature switch S4 turns on. As a result, the relays R1 and R2 both become operative to connect only the motor-fan 4 to the power source B. Thus, the motor-fan 4 rotates at a high speed. Namely, the operational mode is "medium drive mode" (condition 3).

Furthermore, e.g. when the engine rotates at a high speed, when the temperature of water flowing from the radiator is more than 90° C. and the temperature of water flowing thereinto is more than 97° C., the water temperature switches S3 and S4 both turn on. As a result, both motor-fans 4 and 5 are connected in parallel to the power supply B. Thus, two motor-fans 4 and 5 rotate at a high speed. Namely, the operational mode is "high drive mode" (condition 4).

On the other hand, when the atmospheric temperature is above 28° C., the atmospheric switch S5 turns on to energize relay windings R1 and R2. In this instance, it is necessary to rise cooling capacity of and radiator. Accordingly, when the temperature flowing from the radiator is less than 90° C., the opeational mode becomes "medium drive mode" (conditions 5 and 7) in which only the motor-fan 4 rotates at a high speed. In contrast, when the temperature of the water flowing from the radiator is above 90° C., the operational mode becomes "high drive mode" (conditions 6 and 8).

The operation of the cooling system will be described when the air conditioner is used (conditions 9 to 24).

In this instance, the pressure of the cooling medium at the input of the condensor is above 15 bar. Further, the pressure switch S1 is always turned on and the normally open contact R3a of the relay R3 is always maintained closed.

Meanwhile, e.g. during spring or fall season, there is possibility that the air conditioner is used in order to demoist or eliminate humidity within the vehicle cabin even if the atmospheric temperature is less than 28° C. In this instance, the motor-fans 4 and 5 are controlled in accordance with the "low drive mode" (conditions 9 and 10) only in the case where the pressure of the cooling medium at the output of the condensor is less than 16 bar and the temperature of the water flowing into the radiator is less than 97° C., i.e. in the case where the radiator 2 and the condensor 3 has sufficient cooling capacity.

Thereafter, when the temperature of water flowing from the radiator and/or that of water flowing thereinto are/is above setting temperatures (90° C. and 97° C.), or when the pressure of cooling medium at the output of the condensor is above 16 bar, he motor-fans 4 and 5 are controlled in accordance with the "high drive mode" mainly due to the fact that the suitable cooling for the radiator 2 is required (conditions 11 to 16).

Further, if the atmospheric temperature is above 28° C. e.g. during summer season, the refrigeration circuit is required to provide maximum cooling capacity, the motor fans 4 and 5 are always controlled in accordance with the high drive mode in order to compensate for insufficient cooling ability of the condensor 3, irrespective of the fact that the temperatures of water flowing into the radiator and flowing therefrom is low or high (conditions 17 to 24).

Thus, the cooling system according to the present embodiment is configured so as to control operational modes for two motor-fans 4 and 5 in accordance with the combinations of five condtions, i.e. the pressures at the input and output of the condensor, the temperatures flowing into the radiator and flowing therefrom and the atmospheric temperature. In this example, the ratio of the high drive mode (parallel drive mode), the medium drive mode (partial or single drive mode) and the low drive mode (serial drive mode) is 4:2:1.

Accordingly, when the air conditioner is not used, the cooling system is operative to drivingly control a group of motor-fans mainly for cooling the radiator, while when the air conditioner is used, it is operative to drivingly control mainly for the condensor, thereby enabling to finely and suitably control draft volume.

In the above-mentioned embodiment, it has been described that the drive mode shift control for motor-fans is carried out using thermoswitches and relay circuit etc. However, it will be apparent that such a drive mode shift control may be effected using a microcomputer.

Further, in the above-mentioned embodiment, it has been described that serial/parallel drive control is applied to the two motor system. However, it is probably needless to say that the present invention is applicable to other motor system, e.g. four motor system etc.

As stated above, the air-conditioning system for a vehicle according to the present invention can adequately and finely adjust draft volume to the radiator and the condensor in accordance with the operating conditions of an air conditioner and changes in atmospheric temperature. Further, the present system can prevent both noise produced when the motor-fans are inadequately driven, and wasteful consumption of power.

It should be understood, of course, that the foregoing relates only to preferred embodiments of the present invention and that numerous modifications or alterations may be made therein without departing from the spirit and scope of the invention as set forth in the appended claims.

What is claimed is:

1. An air-conditioning system for a vehicle configured so as to vary draft volume to the radiator through which engine cooling water is circulated and to a condensor provided in a refrigeration circuit for an air conditioner, in accordance with operating conditions of the engine and an air conditioner, comprising:
   a set of motor-fans for air cooling the radiator and the condensor;
   a plurality of sensor means for sensing, respectively, the temperature of engine cooling water, the pressure of refrigerant flowing into the condensor, and atmospheric temperature;
   an operational mode control means responsive to said plurality of sensor means for alternately establishing one of a plurality of operational modes programmed based on how power is supplied to said plurality motor-fans, thereby enabling fine adjustment of the draft volume to the condensor in order to effect a desired cooling of the engine, said operational modes including a parallel drive mode for parallely providing power to each of said plurality of motor-fans, a serial drive mode for serially providing power to said plurality of motor-fans, a partial drive mode for providing a power to less than all of said plurality of motor-fans, and an OFF mode for disconnecting said plurality of motor-fans from the power source.

2. An air-conditioning system of claim 1, wherein one of said sensor means is provided at an inlet port of the condensor.

3. An air-conditioning system of claim 1, wherein one of said sensor means is provided at an outlet port of the condensor.

4. An air-conditioning system according to claim 1, wherein said operational mode control means comprises a combination of electro-magnetic relays responsive to said plurality of sensor means.

5. An air-conditioning system according to claim 1, wherein one of said sensor means comprises one of a thermostatic switch and a thermistor.

6. An air-conditioning system of claim 1, wherein said vehicle includes a vehicle body and one of said sensor means is positioned outside of said vehicle body for sensing atmospheric temperature.

7. An air-conditioning system of claim 1, wherein said sensor means for sensing the pressure of refrigerant flowing into the condensor produces a signal indicating when the air conditioning system is operative, and said operational mode control means is responsive to said sensor means for sensing atmospheric temperature to operate said set of motor-fans in said parallel drive mode whenever said air conditioning system is operating and the sensed temperature is above a predetermined limit.

* * * * *